United States Patent
Raj et al.

(10) Patent No.: US 10,108,931 B2
(45) Date of Patent: Oct. 23, 2018

(54) LOCK-BASED UPDATING OF A DOCUMENT

(71) Applicant: Oracle International Corporation, Redwood Shores, CA (US)

(72) Inventors: Alvin Andrew Raj, Woburn, MA (US); Matthew Jakubiak, El Granada, CA (US); Bo Jonas Birger Lagerblad, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 453 days.

(21) Appl. No.: 14/866,395

(22) Filed: Sep. 25, 2015

(65) Prior Publication Data

US 2016/0092462 A1    Mar. 31, 2016

Related U.S. Application Data

(60) Provisional application No. 62/056,433, filed on Sep. 26, 2014, provisional application No. 62/079,363, filed on Nov. 13, 2014.

(51) Int. Cl.
*G06F 17/30* (2006.01)
*G06Q 10/10* (2012.01)
*G06F 9/451* (2018.01)
*G06F 9/44* (2018.01)

(52) U.S. Cl.
CPC ......... *G06Q 10/101* (2013.01); *G06F 9/4443* (2013.01); *G06F 9/451* (2018.02)

(58) Field of Classification Search
CPC . G06Q 10/101; G06F 9/4443; G06F 11/1402; G06F 17/30008; G06F 17/246; G06F 17/30595; G06F 17/2247; G06F 17/2241; G06F 17/218; G06F 17/30011; G06F 9/451
See application file for complete search history.

(56) References Cited

U.S. PATENT DOCUMENTS

| | | | |
|---|---|---|---|
| 6,670,969 B1 * | 12/2003 | Halstead, Jr. ............. | G06F 9/52 707/999.103 |
| 6,868,541 B1 * | 3/2005 | Such ....................... | G06F 9/542 718/104 |
| 7,823,150 B2 * | 10/2010 | Grcevski ................. | G06F 9/526 718/1 |

(Continued)

*Primary Examiner* — Leslie Wong
(74) *Attorney, Agent, or Firm* — Kilpatrick Townsend & Stockton LLP

(57) ABSTRACT

Mechanisms can be provided for locking a component and extending the lock to one or more additional component(s) in a visual analyzer application. Embodiments can receive a request for a first component of a document for a first thread where the document is displayed by a graphical user interface (GUI) and has components including the first component and a second component. A lock manager may lock the first component. An action handler can determine, based on code associated with an event pertaining to the request, that the second component also needs to be locked. The lock manager may lock the second component for a same thread, if the first and second components are not currently locked. Additional user actions directed to other components of the application not currently locked may still proceed, permitting asynchronous calls to be processed without interference with a previous action that has already started.

17 Claims, 11 Drawing Sheets

(56) References Cited

U.S. PATENT DOCUMENTS

| | | | |
|---|---|---|---|
| 2002/0065848 A1* | 5/2002 | Walker | G06F 17/24 715/205 |
| 2003/0179230 A1* | 9/2003 | Seidman | G06F 3/1454 715/750 |
| 2004/0122897 A1* | 6/2004 | Seelemann, II | G06F 17/30557 709/204 |
| 2004/0230903 A1* | 11/2004 | Elza | G06F 17/2241 715/234 |
| 2005/0144330 A1* | 6/2005 | Richardson | G06F 9/526 710/1 |
| 2006/0248449 A1* | 11/2006 | Williams | G06F 8/20 715/209 |
| 2006/0248480 A1* | 11/2006 | Faraday | G06F 9/4443 715/866 |
| 2007/0112714 A1* | 5/2007 | Fairweather | G06F 8/427 706/46 |
| 2007/0169042 A1* | 7/2007 | Janczewski | G06F 8/314 717/149 |
| 2010/0198787 A1* | 8/2010 | Robertson | G06F 17/30389 707/634 |
| 2010/0305721 A1* | 12/2010 | Kostadinov | G05B 19/0426 700/87 |
| 2011/0074710 A1* | 3/2011 | Weeldreyer | G06F 3/0481 345/173 |
| 2012/0101980 A1* | 4/2012 | Taleghani | G06F 17/2288 707/608 |
| 2012/0206653 A1* | 8/2012 | Graves | G11B 27/031 348/571 |
| 2015/0127607 A1* | 5/2015 | Savage | G06F 17/30194 707/610 |
| 2016/0092462 A1* | 3/2016 | Raj | G06Q 10/101 707/704 |

\* cited by examiner

LOCK-BASED UPDATING OF A DOCUMENT

CROSS-REFERENCES TO RELATED APPLICATIONS

This application is a non-provisional application and claims the benefit and priority of U.S. Provisional Application No. 62/056,433, filed on Sep. 26, 2014, titled "LOCK-BASED UPDATING OF A DOCUMENT," and U.S. Provisional Application No. 62/079,363, filed on Nov. 13, 2014, titled "VISUAL ANALYZER SYSTEM," both of which are herein incorporated by reference in their entirety for all purposes.

BACKGROUND

Handling multiple asynchronous threads for updating a document presents significant challenges as there can be multiple threads that are needing to access the same parts of the document. For example, if there are two or more threads attempting to access an object (e.g., make changes to a data visualization in a visual analyzer application) at the same time, the object's integrity can potentially be compromised. Typically, in the past, a system would lock the entire document and permit only user action to access the document at a time. However, it is inefficient to allow a single user to perform one action at a time. There is a need for a more efficient system that can allow multiple asynchronous calls into the same document while maintaining the integrity of the various objects that are part of the document.

SUMMARY

In certain embodiments, techniques (including systems, devices, methods, code or program instructions executed by one or more computer processors) are provided for locking one or more components and extending the lock to one or more additional component(s) in a visual analyzer application. Some embodiments can determine an event associated with a user's interaction with a first component of a document. A lock manager of the visual analyzer application may lock the first component of the document. Certain embodiments can determine a set of actions associated with the event and determine that a second component may need to be locked based on the set of actions. The lock manager may then extend the lock to cover the second component in addition to the first component. In some embodiments, the lock can be extended to cover more than one component of the document for a same thread. The user may continue to interact with other components in the document that have not been locked, permitting the visual analyzer application to process asynchronous calls directed at those other components for another thread in some embodiments.

Some embodiments provide techniques (e.g., a method, a system, non-transitory computer-readable medium storing code or instructions executable by one or more processors) for extension of a lock to one or more additional component(s) in a visual analyzer application. One such technique can include receiving a request for a first component of a document for a first thread, the document displayed by a graphical user interface (GUI) and having multiple components including the first component and a second component; locking, by one or more processors, the first component of the document; and locking the second component of the document for the same thread.

In some embodiments, the technique can further include upon receiving another request for a third component in the document for a second thread, locking the third component of the document, where the third component is not currently locked by a prior event. The technique can also further include upon receiving another request for the first component in the document for a second thread, queueing the other request until the lock on the first component has been released. In certain embodiments, the technique may further include determining a set of actions for the first thread, the set of actions specifying a request for the second component, wherein the second component is locked in response to the request for the second component.

In some embodiments, the second component is a parent node in the document with a hierarchical structure, the parent node having one or more child nodes. The technique can further include automatically locking the one or more child nodes under the parent node in response to locking the second component of the document. In some embodiments, the request for the first component is received upon receiving a user request to resize a visualization component in the GUI, and wherein the first component is the visualization component and the second component is a grid component.

In certain embodiments, the request for the first component of the document is received in response to a user interaction directed at the first component in a GUI of a visual analyzer application. The technique can further include receiving a request for a third component of the document in response to a separate user interaction directed at the third component in the GUI; determining whether to lock the third component based on an event associated with the user interaction, the event specifying to lock one or more additional components, where determining whether to lock the third component includes determining whether the third component and the one or more additional components are currently locked by a prior event; and locking the third component and the one or more additional components when it is determined that the third component and the one or more additional components are not currently locked by a prior event.

DETAILED DESCRIPTION

Figure 1:
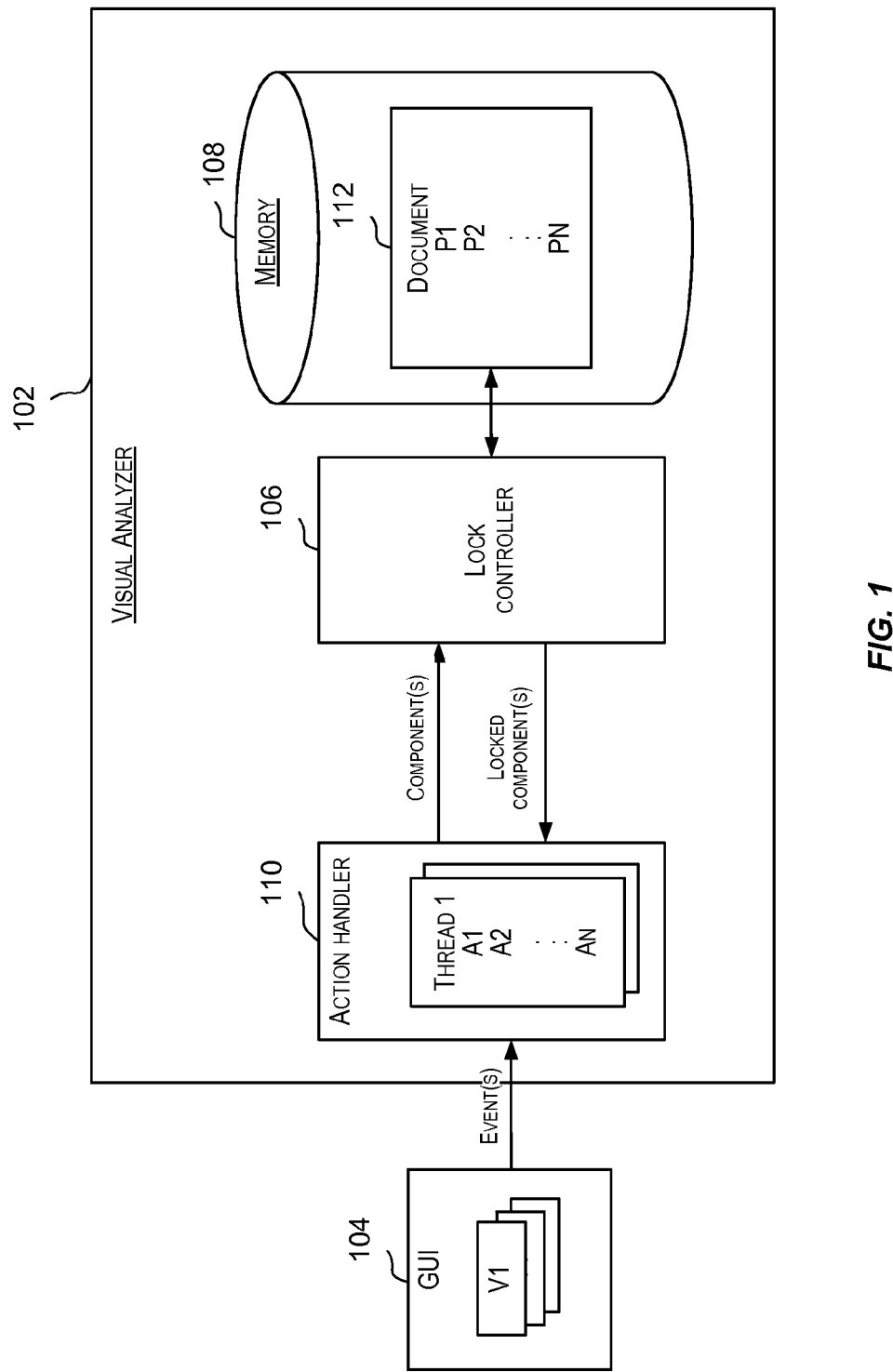
FIG. 1 illustrates an example block diagram of a system in accordance with certain embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

In certain embodiments, techniques (including systems, devices, methods, code or program instructions executed by one or more computer processors) are provided for locking one or more components and extending the lock to one or more additional component(s) in a visual analyzer application. Some embodiments can determine an event associated with a user's interaction with a first component of a document. A lock manager of the visual analyzer application may lock the first component of the document. Certain embodiments can determine a set of actions associated with the event and determine that a second component may need to be locked based on the set of actions. The lock manager may then extend the lock to cover the second component in addition to the first component. In some embodiments, the lock can be extended to cover more than one component of the document for a same thread. The user may continue to interact with other components in the document that have not been locked, permitting the visual analyzer application to process asynchronous calls directed at those other components for another thread in some embodiments.

Ensuring consistency of the various portions of a document (e.g., an XML document that represents the state of a project in a visual analyzer application) is tremendously challenging. For example, asynchronous calls while using a single-threaded programming language (e.g., JavaScript®) can cause one or more functions to affect a component before one or more other functions that the user desires to be applied to the component. Further, there may be multiple actions from a user that may affect different parts of the document and it may not be desirable to prevent these actions from being carried out if the actions do not affect the same components of the document. Conventional methods in locking up the entire document and not allowing users to perform actions on other components of the document that are unaffected by previous actions would be inefficient.

Certain embodiments of the present invention can provide a mechanism for locking one or more components and extending the lock to one or more additional component(s) of a document representing a graphical user interface (GUI) in a visual analyzer application. In some embodiments, the extension of the lock to an additional component can be for a same thread. For portions of the document that are unaffected by the thread, one or more other asynchronous calls can access other components of the document that have not been locked and lock those other components if actions defined by the other thread(s) requires it to do so. In some embodiments, a visual analyzer application can receive a request for a first component (also referred to as a resource throughout this disclosure) of a document for a thread where the document is displayed by a GUI and where the document includes multiple components. In response to receiving the request, the visual analyzer application can lock the first component of the document. Upon determining that the thread includes multiple actions where one of the actions requires the locking of a second component, the visual analyzer application locks the second component of the document for the same thread. In certain embodiments, the second component of the document may be locked for a different thread.

In some embodiments, a system can determine one or more components to which to extend the lock for a thread based on an event associated with a user's interaction with a first component. In certain embodiments, the one or more components can be determined in response to determining that execution of the code of the event associated with the first component would affect the one or more additional components. For instance, when the user is resizing a visualization component, a component to which a lock can be extended can be a grid component affected by the resizing of the visualization component, in addition to the visualization component. In another instance, when the user is adding a new column to a visualization component, a component to which a lock can be extended can be the visualization component in addition to the criteria component that includes the various columns. Some embodiments may determine, dynamically, and on-the-fly, which components may be affected by the user's interaction with a first component and lock the multiple components during the execution of the event. The execution of the code associated with the event may be associated with a single thread in certain embodiments where a single thread handles an event loop (an event runs in its own thread). In some embodiments, the execution of the code associated with the event may be associated with multiple threads.

Further, upon receiving another user action directed to a third component, prior to completing the execution of the code associated with the previous event, if the system determines that the other user action (that would affect the third component and one or more additional components) may affect one of the first component or the second component, then the system may not continue to execute the code associated with the new event. In some embodiments, the system may wait until the previous event is complete to process the new event that may affect the first or the second component. If, on the other hand, the system determines that execution of the code of the event associated with this other user action would not affect the first or the second component, then the system may proceed to lock the third component and the one or more additional components affected by this separate event. As such, components that are unaffected by a first event can still be interactive and affected by a user while the first event is being executed. This minimizes overall processing time and ensures the overall efficiency of the visual analyzer system.

In some embodiments, a visual analyzer system can present one or more visualizations to a user via a visual analyzer application presented by a web browser (e.g., on a mobile device). In certain embodiments, a visualization is a visual representation of some data. In one embodiment, a visualization can display graphic elements, shapes and/or text. Examples of a visualization may include a table, a cross table, a graphical table, a bar chart, a line chart, a combination chart, a pie chart, a scatterplot, a map chart, a treemap, a heat map, a parallel coordinate plot, a summary table, a box plot, a text area, a user created or customizable chart, etc. The visual analyzer system may generate a visualization with multiple graphical attributes (also referred to as edges) that each correspond to a specified dimension.

For example, a visual analyzer application can generate a bar chart with color, axis, size attributes that each corresponds to a dimension specified by a user such as time, sales, and entities. Each dimension may also have one or more dimension members, such as years 2009, 2010, 2011, company names X, Y, Z, and different types of products, etc.

Each visualization can include values for multiple dimensions of data from one or more columns in a database in some embodiments. A database can be a relational database that includes one or more tables. A table can have a set of rows and a set of columns. A dimension can correspond to a column of a table (or a database) while a record can correspond to a row of a table (or a database). In some embodiments, the visual analyzer application user interface (e.g., displayed through a web browser) can provide a projection of one or more databases. The user can identify one or more dimensions of data available in the one or more databases and request the visual analyzer application to generate a visual representation that represents the one or more dimensions of data retrieved from the databases.

In some embodiments, a visualization can have one or more edges (also sometimes referred to as an attribute) that represent the various dimensions (also referred to as criteria or columns of a database) of the visualization. A common set of edges can include row (also referred to as x-axis), column (also referred to as y-axis), category, values, color shape, size, etc. For example, a scatter chart may use all of those edges. A bar chart may use row, column, category, values, color, and size. A pivot table may use all of the common set of edges except for detail. A map may use row, column, category, color (map shape), color (bubble), and size. Different dimensions can include revenue, brand, year, company name, product type, etc. A dimension can be represented by an edge of a visualization. For example, a brand dimension can be represented by the color edge of a pie chart (or any other type of visualization), a revenue dimension can be shown in the values edge of a bar chart (or any other type of visualization), a year dimension can be shown in the rows edge (e.g., trellis rows that are good for small multiples), a company dimension can be shown in the columns edge (e.g., trellis columns), a product type dimension can be represented by the shape edge where each distinct value (also referred to as dimension member) is assigned a shape (e.g., circle, square, diamond, etc.), etc.

Each visualization may have configuration information that includes one or more edge identifiers identifying the edges of a visualization, one or more edge values corresponding to each edge, and one or more edge tags for each edge. The edge identifiers identifying the edges of a visualization can include a visualization type, a color, a size, an area, x-axis, y-axis, geo-coordinates, etc. Different visualizations of different visualization types may have a different set of edges. For instance a pie chart can have the following edges: color, size, etc. while a bar chart may have the following edges: x/col, y/row, color, category, values, color, size, etc.

Each edge can have one or more edge values and one or more edge tags (also referred to as functional tags or just tags). In some embodiments, the functional tags can be properties of edges on a visualization that describe what those edges do to a data column. In some embodiments, the edge tag can indicate whether an edge is a required edge or not a required edge for a visualization. If the edge tag indicates that an edge is a required edge, then the edge must have a value for the visualization to render in some embodiments. Certain embodiments may not have any required edges for any visualization.

The visual analyzer system can generate one or more visualizations based on one or more dimensions of data specified by a user. For example, the user may specify multiple dimensions such as time, sales, and entities to be represented by a visualization. The visual analyzer system may then generate a visualization with multiple edges (also referred to as graphical attributes) that each correspond to a specified dimension. For example, a visual analyzer application can generate a bar chart with color, axis, size edges that each corresponds to a dimension specified by a user such as time, sales, and entities, respectively. As described, the visual representation may be a pie chart, bar chart, or any other type of graphic where different edges such as color, axis, size, etc. can represent the desired dimensions specified by the user.

Some embodiments can lock one or more portions of a document structure and extend the lock to one or more other portions of the document (e.g., for a single thread). In some embodiments, an algorithm for performing concurrent or semi-concurrent updates of an XML structure or hierarchy can be provided. When a user input affects a subset of a report (e.g., a change in coloring in a particular visualization), some embodiments trigger report to the server to generate a new data visualization for that service. The action may take a few seconds and possibly up to minutes depending on the speed and capabilities of the database(s). During that time, it may not be desirable to block the entire user interface. Locking only a particular subset of the document enables the user to perform other tasks that do not affect that particular subset of the report. For instance, the user may be able to change the visualization next to it without being affected. As JavaScript is a single-threaded programming language, asynchronous calls to the server may be treated like a separate asynchronous thread. This system ensures that a separate user action (e.g., by the same user or a second user) that does not affect components that are currently locked can be initiated asynchronously and executed while not interfering with the previous action that has already begun execution and is ongoing.

Certain embodiments perform locking on a client side in a JavaScript heavy application that allows different threads to continue to use the lock and extend the period for which the lock is used across multiple client server communications. This solves the problem of having multiple asynchronous threads that are needing to access the same part of a document and updating it. If two threads are accessing different parts of the document tree, the lock can be extended such that the calling thread has a lock on both parts of the document tree. As such, they can both access the document tree. This allows multiple asynchronous calls into the same document and allows each of the asynchronous threads to lock different portions of the document and make changes to the document. If another completely separate action done by the user comes in, the portions locked by those asynchronous threads will be locked so that this other client cannot have access to those portions of the tree structure.

Systems depicted in some of the figures may be provided in various configurations. In some embodiments, the systems may be configured as a distributed system where one or more components of the system are distributed across one or more networks in one or more cloud infrastructure systems.

For ease of understanding, the use of reference numerals ending in a letter (e.g., "M" or "N") may indicate that different numbers of that referenced element may exist in different embodiments. For example, a reference to actions A1-AN does not indicate that there must be 14 such actions, but instead that there may be any number of visualizations.

As used herein, the term "document" is used to refer to a representation or a state of a GUI. In some embodiments, the document may include multiple portions including at least a first portion and a second portion. In certain embodiments, the document may be a project XML that represents the state of a project in a visual analyzer application. In a visual analyzer application, a document can include multiple visualization components and other components that can be displayed on a GUI of the visual analyzer application.

As used herein, the term "component" is used to refer to an HTML element. A component can also be referred to as a component object, which can be an instance of a component class. The document can include one or more components that are displayed on a GUI of a visual analyzer application. A user may interact with the one or more components and make modifications to the one or more components.

The term "server" as used herein typically refers to an application that executes and operates as a server according to a client-server protocol. Some examples of servers include database servers, web servers, application servers, file servers, mail servers, print servers, gaming servers, etc. In some contexts, though, the term "server" may also refer to computing hardware that can or does execute a server application. However, the particular meaning of a use of the term "server" will be apparent to those of skill in the art based upon its context of use.

While JavaScript is a single-threaded programming language, embodiments may permit asynchronous calls. As JavaScript does not allow preemption, each function is a block of code that is "atomic" where the sequence of instructions are executed sequentially, without interruption. In order to ensure that a set of functions (e.g., A, B, C) are called before another set of functions (D, E, F), some embodiment can utilize a locking mechanism described in this disclosure.

I. System Overview

FIG. 1 illustrates an example block diagram of a system 100 in accordance with certain embodiments of the present invention. As shown, system 100 includes a visual analyzer subsystem 102 communicatively coupled to GUI 104 that has multiple components displayed. In this example, visual analyzer subsystem 102 includes multiple components such as, but not limited to, a lock controller 106, memory 108, and an action handler 110. The embodiment depicted in FIG. 1 is merely an example and is not intended to unduly limit the claimed embodiments of the present invention. One of ordinary skill in the art would recognize many variations, alternatives, and modifications.

In some embodiments, visual analyzer subsystem 102 can be a standalone executable application, a portion of an application (e.g., a browser application or a local application), a configuration file to be used with another application, etc. with components distributed across one or more servers or a client device. A visual analyzer application can display one or more visualizations via GUI 104 e.g., on a client device. User interaction with GUI 104 may cause multiple resources from a document to be requested by GUI 104. One or more visual analyzer components (e.g., a data visualization, a toolbox component, a dialogue component, a data elements pane) can be generated by the visual analyzer application and displayed on a device through GUI 104 presented by a web browser or a visual analyzer application. The web browser or the visual analyzer application user interface can provide a projection of one or more databases using one or more representations (e.g., tabs, text, menus, business objects, folders). The user can select one or more dimensions of data (also referred to as columns in a database, or business objects) available in the one or more databases to be presented by a visualization. The application may then generate and display a visualization based on the one or more dimensions of data that the user would like represented through the visualization. As described, an example of a database is a relational database with columns and rows. A dimension of data can correspond to a column in a database while records can correspond to the rows in the database.

Visual analyzer subsystem 102 includes lock controller 106, memory 108, and action handler 110 in some embodiments. In some embodiments, lock controller 102 can keep track of the resources of the document and determine which components to lock and to unlock during each event. In some embodiments, lock controller 102 determines, based on information received from action handler 110, whether a component can be locked. If the component can be locked, lock controller 102 can lock the resource. If lock controller 102 determines that the component cannot be locked (e.g., because the component is currently locked for example for another thread or action), then lock controller 102 will not lock the resource for the separate action. In some embodiments, lock controller 102 may execute on a computing device such as a server or on a client device.

Action handler 110 can determine one or more functions to execute based on an event triggered by a user action performed on GUI 104. Action handler 110 may also execute on a computing device such as a server or on a client device. Upon receiving an event, action handler 110 can determine the resources it needs to lock (e.g., at this particular moment, on-the-fly dynamically) and action handler 110 will request lock controller 102 for permission to lock. Lock controller 102 may then return with a response as to whether the component can be and/or is to be locked or not. As additional events occur, action handler 110 can perform a separate determination as to the resources needed for the event and communicate with lock manager 102 for permission to lock any additional resources.

As shown, action handler 110 (or multiple action handlers 110 (not shown here)) can handle one or more events as the events are detected from GUI 104. In some embodiments, the software code for each event can be processed by a thread. Based on the software code to be executed for an event, action handler 110 can determine one or more actions associated with the event. Action handler 110 can determine, based on the one or more actions associated with the event, that locks on additional components will be needed for the event. Upon determining that the multiple components will need to be locked (including the component at which the user action was directed on GUI 104), action handler 110 can send a request to lock controller 106 for these components to be locked. Multiple locks can be placed on these components, or one can call this the extension of a lock(s), from the initial component at which the user action was directed, to the additional components needed for the event.

Memory 108 can include document structure 112 with multiple portions (e.g., p1, p2 . . . pN). Document 112 can represent GUI 104. Lock controller 102 can access document 112 when determining whether portions of document 112 can be locked. In some embodiments, lock controller 102 may determine that since certain portions have already been locked for a thread/action, those portions may not be locked again until the lock has been released. In certain embodiments, lock controller 102 may permit other portions of document 112 that have not yet been locked to be locked for any additional threads/actions.

The user can perform one or more user interactions directed to one or more visual analyzer components displayed on GUI 104. For example, after one or more visualization have been generated and presented on GUI 104, the user may specify one or more modifications to a visualization. The modification can be a resizing of the visualization. The modification can be an addition of, a removal of, or some other sort of modification to one or more dimensions of data represented by the visualization. Upon receiving a user interaction directed to one or more visual analyzer components, GUI 104 can determine the event associated with the user interaction. The event can include a resizing event, a data modification event, a visualization addition/removal event, etc.

In some embodiments, action handler 110 can receive an event from GUI 104 and determine one or more actions (also referred to as functions) associated with the event. Action handler 110 can determine, based on the functions, one or more components (also referred to as portions of the document) that would need to be locked for a thread. In some embodiments, action handler 110 can send a request to lock manager 106 to lock the one or more components for the thread. In certain embodiments, there may be multiple action handlers that can determine functions associated with an event for multiple events. Each action handler can be handled by the same thread in some embodiments.

Lock controller 106 may receive the request for one or more components or portions of a document to be locked based on actions for a thread and determine whether the one or more components can be locked. In some embodiments, lock controller 106 can review document structure 112 to determine whether the one or more components that lock controller 106 desires to lock have already been locked. If one of the components has already been locked, then lock controller 106 may not lock the component for the thread. If the components have not been locked, lock controller 106 may proceed to lock the one or more components for the thread. In some embodiments, multiple components may be locked for the single thread. The components may be sibling components in one embodiments. In some embodiments, one of the components may be a parent node in a hierarchical document structure. As such, additional components such as the child nodes of the parent to be locked may also be automatically locked under the same thread. Upon determining whether to lock certain components, lock controller 106 may convey such information to action handler 110 or directly to GUI 104.

Various components of the document may be interacted with by another user interaction with the document and thereby locked by other events. GUI 104 may receive additional, multiple user interactions with one or more components displayed by GUI 104. In some embodiments, action handler 110 may receive additional events while a thread is still executing code associated with the prior event. In certain embodiments, action handler 110 may proceed to determine the one or more actions associated with the new event and the one or more components that may be affected by the one or more actions. Action handler 110 may send identifiers of the components that may need to be locked for the separate thread for the new event to lock controller 106 in some embodiments.

Upon receiving the identifiers of the components to be locked, lock controller 106 may determine whether the components can be locked. In certain embodiments, lock controller 106 may determine that one or more components have already been locked by a prior event which is still processing. In some embodiments, lock controller 106 may determine that the one or more components have not been locked by a prior event and proceed to lock the one or more components.

As described, in some embodiments, the document structure can be a hierarchical one where resources can be hierarchical. In one example, the largest grain can be an entire report while the smallest grain can be an entire view (also referred to as visualization). If the report component is locked, then the report/criteria component cannot be locked (since the report/criteria node is a child node of the report component). If the report/criteria component is locked, a lock can still be placed on report/layouts component as they are sibling nodes (i.e., on the same level of the hierarchical structure). Locks can be placed on certain parent nodes of the hierarchical structure depending on the code for each event. In certain embodiments, lock controller 106 may lock one or more components that include a parent node representing a component which would in turn automatically, without instruction code specifying the need to, lock the child nodes representing one or more various other components of document 112.

II. Computing Environment

Figure 2:
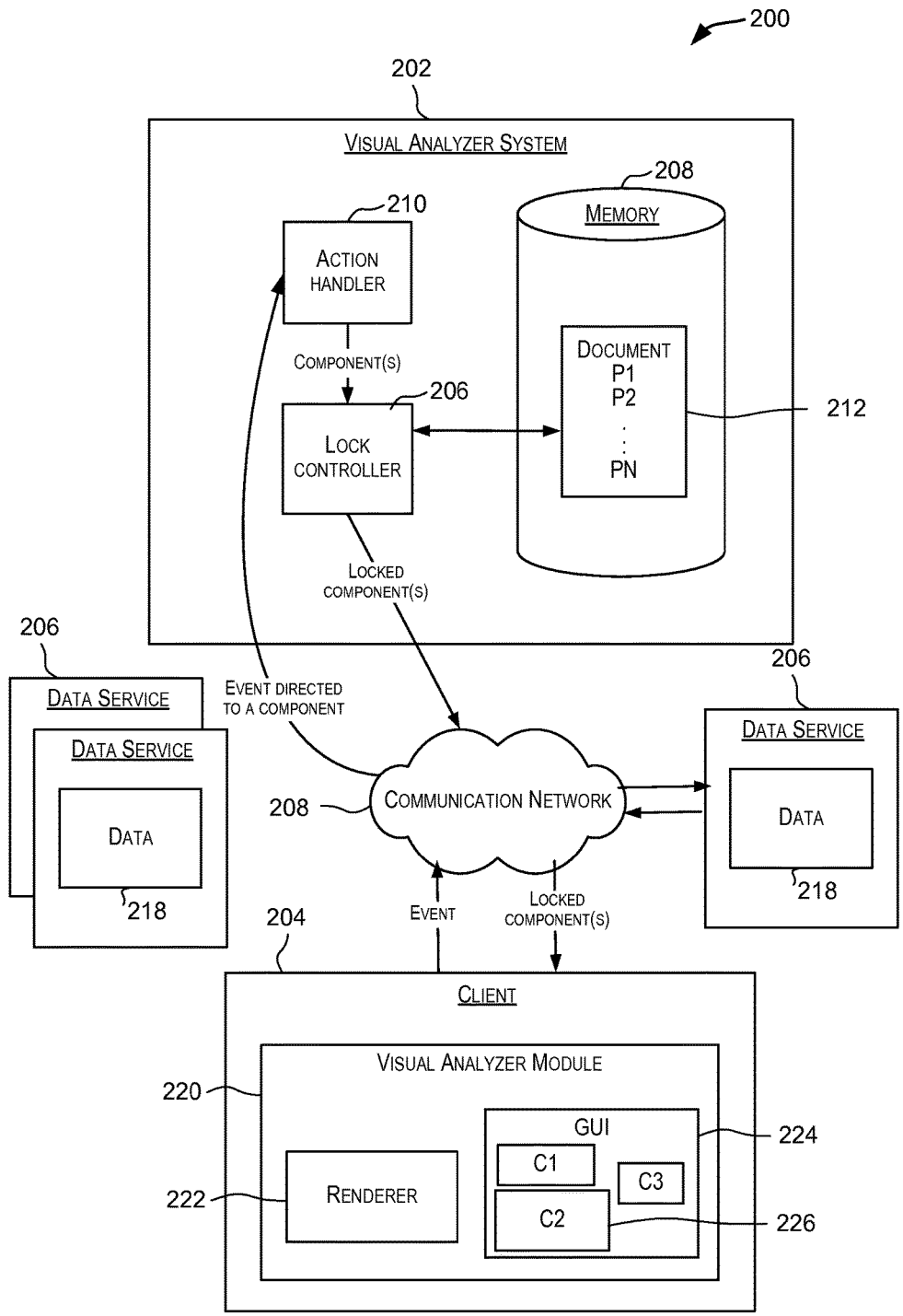
FIG. 2 illustrates an example block diagram of a computing environment in accordance with certain embodiments of the present invention.

FIG. 2 illustrates an example block diagram of a computing environment 200 in accordance with certain embodiments of the present invention. As shown, computing environment 100 includes visual analyzer system 202 (similar to visual analyzer subsystem 102 from FIG. 1) communicatively coupled to client device 204 and data service(s) 206 via a communication network 208. The embodiment depicted in FIG. 2 is merely an example and is not intended to unduly limit the claimed embodiments of the present invention. One of ordinary skill in the art would recognize many variations, alternatives, and modifications. For example, visual analyzer system 202 can be part of client device 204. In certain embodiments, visual analyzer system 202 and/or visual analyzer module 220 can be located on one or more servers.

Client device 204 may be of various different types, including, but not limited to a personal computer, a desktop, a mobile or handheld device such as a laptop, a mobile phone, a tablet, etc., and other types of devices. Communication network 208 facilitates communications between one or more client devices such as client device 204 and visual analyzer system 202. Communication network 208 can be of various types and can include one or more communication networks. For example, communication network 208 can include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, communication network 208 may include any communication network or infrastructure that facilitates communications between one or more client devices such as client device 204 and visual analyzer system 202.

Client device 204 can display one or more visual representations (also referred to as components, graphics, charts, visualizations, or vizs) through a web browser or a GUI of a visual analyzer application in some embodiments. A visual representation can be generated based on dimensions of data (also referred to as columns in a database, or business objects) identified by a user of client device 204. In some embodiments, a user of client device 204 can select one or more dimensions of data 218 available from various data services 206. Upon receiving the user's selection of the one or more dimensions of data 218, visual analyzer module 220 can obtain the requested data from data service 206 via communication network 208 and generate a visual representation 226. Renderer 222 can then render visual representation 226 on GUI 224 of client device 204. A GUI 224 can present multiple visual representations 226 to the user based on a document (e.g., a project XML representing the state of GUI 224) in some embodiments.

In certain embodiments, visual analyzer module 220 can generate multiple visual analyzer components (e.g., data visualizations, windows, menus, property panes, etc.) and cause those components 226 to be displayed on a dashboard of the application (e.g., GUI 224). In some embodiments, visual analyzer module 220 on client device 204 can be part of a browser application or a local application. The web browser or the visual analyzer application user interface can provide a projection of one or more databases. The user can identify one or more dimensions of data available in the one or more databases and request the visual analyzer application to generate a visual representation that represents the one or more dimensions of data retrieved from the databases. As described, an example of a database is a relational database with columns and rows. A dimension of data can correspond to a column in a database while records can correspond to the rows in the database.

Visual analyzer system 202 can include multiple components such as, but not limited to, lock controller 206 (similar to lock controller 106 of FIG. 1), memory 208 (similar to memory 108) including document 212 (similar to document 112), and an action handler 210 (similar to action handler 110). In some embodiments, lock controller 206 of visual analyzer system 202 may lock a first component (e.g., a visualization component, a grid component) at which the operation is directed. For instance, the first component may be a visualization object 226 (also referred to as visualization, graphic, visual representation) that the user has specified a change in dimension, color, or size, etc. In some embodiments, lock controller 206 in visual analyzer system 202 may lock visualization object 226 after receiving the indication that the user would like to perform changes to visualization object 226. In this instance, the changes may include retrieving data (e.g., new dimension of data or new data column) 218 from data service 206 such that visualization object 226 may be updated with the new data 218. As such, action handler 210 in some embodiments may determine that the criteria component of visual analyzer application (governing the data columns) may also need to be locked.

In some embodiments, action handler 210 of visual analyzer system 202 performs the determination that another component may be affected by the operation performed on the first component. For instance, the visual analyzer system may determine that a resizing of the visualization(s) may be necessary upon performance of the first operation. Upon determining an event that includes receiving user indication of modification directed to visualization component 226, visual analyzer module 220 may send event information and/or an identifier of the visualization component 226 to action handler 210 in visual analyzer system 202. In response to receiving event information and/or an identifier of the original component 226 to which the event was directed, action handler 210 can determine which visual analyzer components may be affected by the user interaction directed to an initial component 226. In some embodiments, action handler 210 can make the determination based on a set of dependency rules (not shown here). For instance, action handler 210 can determine that the event that includes the incorporation of a new column into visualization component 226 may cause visualization component 226 to be resized and thus may affect a resizing component (also referred to as a grid component). As such, action handler 210 may determine that second component (e.g., resizing component) is a component that would be affected by execution of code associated with the event.

Upon determining that the second component should be locked, lock controller 206 in visual analyzer system 202 may then lock the additional component affected by the first operation/event. In one instance, the additional component may be the grid that holds the layout. In one embodiment, lock controller 206 may not lock any other visualizations but the grid in between the visualizations (also referred to as viz layout), which is a separate node by itself. While in some embodiments lock controller 206 in visual analyzer system 202 may perform the locking and extension of the lock to one or more additional components, some embodiments may send the information as to which components to lock to visual analyzer module 220 on client 204. Visual analyzer module 220 may then perform the locking of one or more visualization components.

In some embodiments, lock controller 206 can determine whether to lock the component(s) identified by action handler 210. Some embodiments may have locking rules (not shown here) that lock controller 206 may follow. In some embodiments, lock controller 206 may determine whether second component should be locked based on locking rules. For example, locking rules may specify whether components that have already been locked by a prior ongoing event can be locked by the new event, depending on the context surrounding the new event or the type of event. Given a certain type of event, lock controller 206 may determine not to lock the second component.

In some embodiments, locking may be done hierarchically, so that an entire section of any of its subsections can be locked. In certain embodiments, upon receiving a modification to a portion of the hierarchical tree structure, the system may during the execution of the event discover that a larger portion of the document structure needs to be locked and perform such an umbrella lock. In one embodiment, once a parent is locked, everything below may become locked. However, locking the parent may be avoided in some instances because it may not be desirable to lock the entire code or user interface. Some embodiments avoid locking its parent while locking a sibling as locking a parent may block out a large portion of the tree and as such it may be desirable to minimize the locking. Some embodiments may simply lock one or more siblings. Upon locking the one or more sibling components, a user may continue to interact with the other components in the application, until interaction with those other components may affect components that are concurrently locked by a prior ongoing event (e.g., either the grid component or the original visualization component).

III. Example Flow Chart

Figure 3:
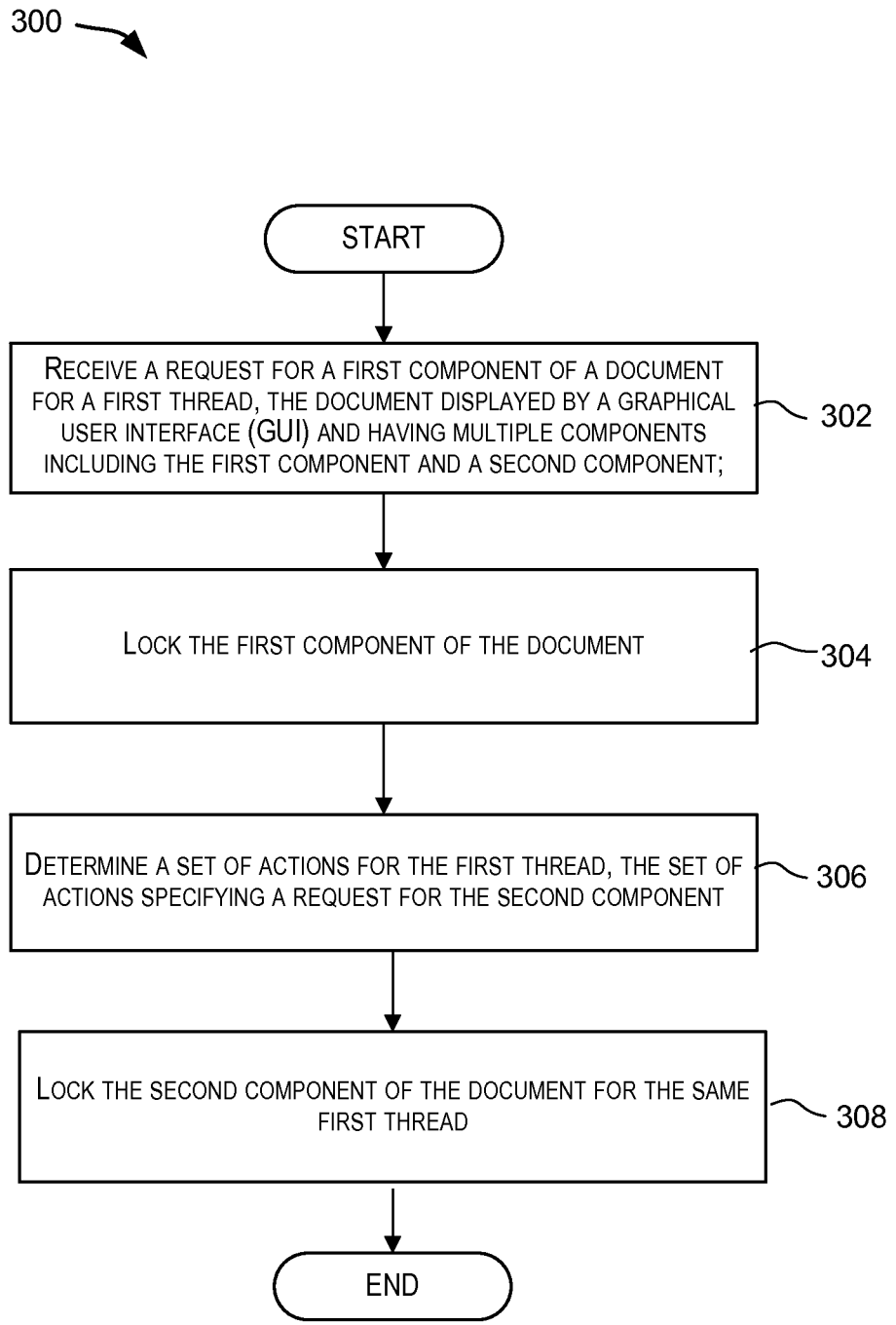
FIG. 3 illustrates an example process of extending a lock to an additional visual analyzer component in accordance with some embodiments of the present invention.

FIG. 3 illustrates an example process 300 of extending a lock to an additional visual analyzer component in accordance with some embodiments of the present invention. Some embodiments can perform lock expansion to allow partial locking of an application in a client/server data analysis tool such as the visual analyzer. In response to receiving a user interaction with one or more components (e.g., a visualization component) displayed on a GUI of the visual analyzer application, the visual analyzer application can lock one or more items. During the execution of software instructions associated with the event, the visual analyzer application may determine that the lock needs to be expanded to cover additional components. Multiple components of the visual analyzer application may then be locked for a thread.

At block 302, process 300 can receive a request for a first component of a document for a first thread. The document can be displayed by a GUI and can have multiple components including the first component and a second component. Some embodiments may receive the request for the first component when a user performs an action directed to the first component. For example, the user may perform a series of mouse clicks and keyboard selections to signal that the user would like to resize a visualization component.

At block 304, process 300 can lock the first component of the document. Upon receiving the request for the first component, some embodiments may lock the first component. Some embodiments may determine any additional components that need to be locked prior to locking the first component. By locking one or more components, other processes or threads may not make changes to the locked component(s). User actions directed to a component that is locked may be ignored or queued for a later time, e.g., until the component is no longer locked, until a timer expires.

At block 306, process 300 can determine a set of actions for the first thread where the set of actions specify a request for the second component. Certain embodiments may determine an event associated with the user's interaction with the first component. Some embodiments may determine, based on the code associated with the event, a set of actions to be executed for the event. In some embodiments, in order to execute the code, a second component of the document may also need to be locked.

At block 308, process 300 can lock the second component of the document. In some embodiments, the second component is being locked for the same first thread. In certain embodiments, the second component is being locked for a separate thread. In some embodiments, upon determining that the second component is also required to be locked in order to execute the code for the event, the lock associated with the first component can be "extended" to also lock the second component.

Figure 4:
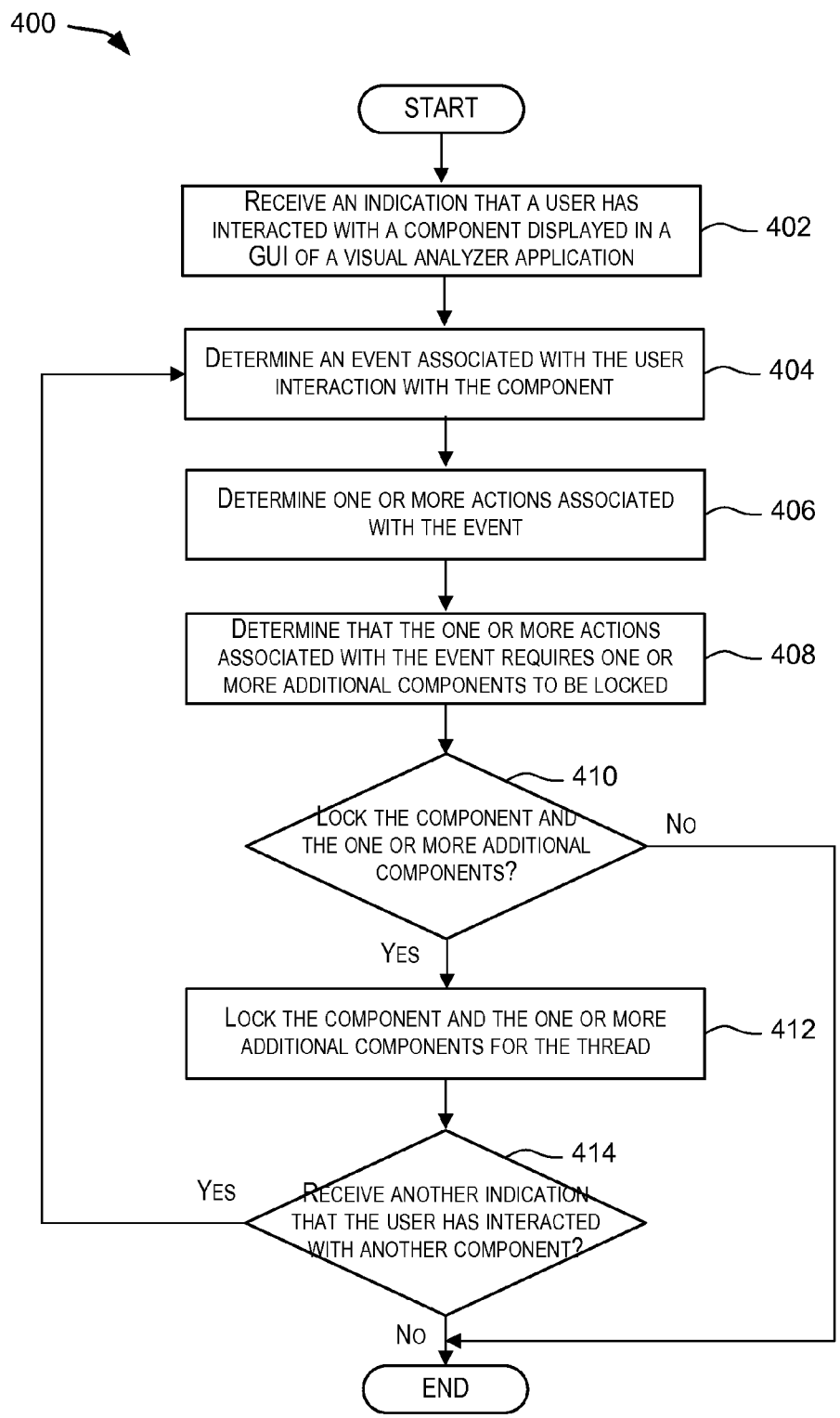
FIG. 4 illustrates an example process of extension of the lock to one or more additional components of a document with a non-hierarchical structure.

FIG. 4 illustrates an example process 400 of extension of the lock to one or more additional components of a document with a non-hierarchical structure. As described, a thread may have multiple actions where the actions may request different portions of a document to be locked. Some embodiments can lock one or more portions of a document structure and extend the lock to one or more other portions of the document (e.g., for a single thread).

At block 402, process 400 can receive an indication that a user has interacted with a component displayed in a GUI of visual analyzer application. In some embodiments, the user may specify one or more actions directed to a component displayed in the GUI such as a selection of a one or more boundaries of a visualization and a dragging of the boundary in a direction. Another example of the one or more actions may be a selection of a column icon and dragging and dropping the icon into a visualization. Another example of the one or more actions may be a selection of multiple columns and dragging and dropping those columns into an area of the canvas layout to create a new visualization.

At block 404, process 400 can determine an event associated with the user interaction with the component. In some embodiments, upon receiving the user action(s) directed to the component, GUI (e.g., GUI 104 from FIG. 1) can convey the action to an event handler (e.g., even handler 110 from FIG. 1) that determines the event associated with the user action. The event can be a resizing of the boundaries of a visualization, a modification to edges of a visualization, an addition of a new visualization, a removal of a visualization, etc. In some embodiments, the event can be handled by a single thread.

At block 406, process 400 can determine one or more actions (also referred to as functions) associated with the event. Depending on the software instruction code for the event, one or more actions may be specified by the event. In some embodiments, the event may include multiple actions including A1, A2, A3, etc. Different types of events may require a different set of actions.

At block 408, process 400 determines that the one or more actions associated with the event requires one or more additional components. For instance, the action handler may determine that for A1, portion 1 would need to be locked and for A2, portion 4 would need to be locked. For the same event, the lock can now be "extended" from covering portion 1 to portion 4 such that both portions can be locked.

At block 410, process 400 determines whether the component and the one or more additional components can be locked. In some embodiments, upon determining that the component and the one or more additional components are not currently locked, lock controller may determine that the components may be locked. In certain embodiments, if lock controller determines that at least one of the components is currently locked, then lock controller may not lock any of the components and wait until the lock on the component(s) is released. In such embodiments, lock controller may serialize code execution when different functions/actions are trying to use the same resource.

At block 412, upon determining that the component and the one or more additional components can be locked, process 400 locks the component and the one or more additional components. Upon determining that the component and the one or more additional components cannot be locked, then process 400 ends. In some embodiments, the process may continue when lock controller determines that the components may be locked (e.g., upon determining that the locks on the components for the prior event has been released).

At block 414, process 400 can determine whether another indication that the user has interacted with another component displayed in the GUI of visual analyzer application has been received. Upon determining that process 400 has received another indication that the user has interacted with another component, process 400 returns to block 404 and determines an event associated with the user interaction with the other component. Similarly, for this new interaction with the other component, process 400 determines action(s) associated with the other event and what other components may need to be locked for this other event. If process 400 determines that the components that need to be locked for this new event are not currently locked for the prior event, then process 400 can lock the components for the separate thread. If process 400 determines that there may be overlapping components that need to be locked for this event and the prior event, then process 400 may end. In some embodiments, the execution of the code for the new event may be queued or may simply end. As processing for an event is completed, the locks may be released in some embodiments.

Figure 5:
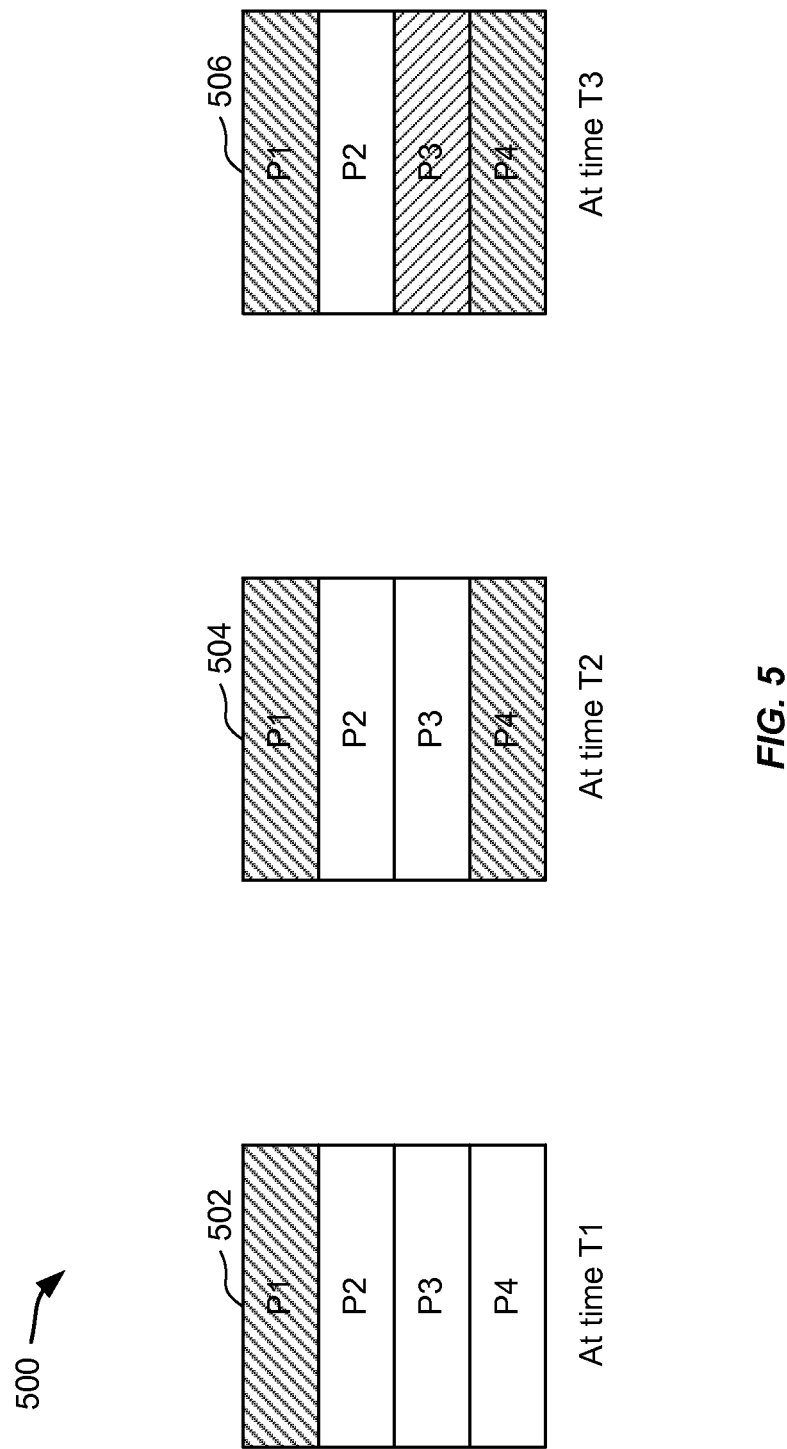
FIG. 5 illustrates an example sequence of locking multiple document components in a non-hierarchical document structure.

FIG. 5 illustrates an example sequence 500 of locking multiple document components in a non-hierarchical document structure. As shown in this example, a document 502 can include multiple portions such as P1-P4. Upon receiving a user action directed to a portion of the document, the visual analyzer application may determine an event associated with the user action. The event may include multiple actions for a thread. The same thread can have multiple actions, such as A1, A2 . . . An, that it needs to run through in executing the code for the event. In some embodiments, the thread executing the code for the event may request one or more portions of the document to be locked. For example, A1 may require resource 1 (also referred to as P1) to be locked. As such, visual analyzer application (e.g., a lock manager (also referred to as lock controller) that is part of the application) may then lock P1. A2 may require resource 4 (also referred to as P4) to be locked. The lock may then be "extended" for the same thread to also lock P4.

In some embodiments, lock manager may request one or more components or portions of a document such as P1 and P2 to be locked based on actions for a thread. As shown in sequence 502, at time T1, the first thread may request to lock P1. In sequence 504, at time T2, the first thread may also request to lock P4. Although initially this thread only locked P1 of the document, the lock has now been expanded to also lock P4, another portion of the document. The lock for this thread has now been "extended" from P1 to P4.

In some embodiments, a lock manager (e.g., lock controller such as lock controller 106 in FIG. 1 that is part of the visual analyzer application) may receive additional requests to lock additional components of the document. For example, lock manager may request another component(s) or portion of the document such as P3 to be locked based on action(s) for another thread. If another thread comes in and requests to lock P3, such as that shown in sequence 506, the lock controller may grant the request and lock P3. In certain embodiments, upon receiving the request, lock controller may determine whether P3 may be locked. In some embodiments, since P3 is currently unlocked, lock manager may determine that P3 may be locked for the separate thread.

However, if another thread requests to lock P4, lock controller may then determine that P4 is already locked and therefore it cannot be locked for this thread. In some embodiments, the request to lock P4 can be queued. Lock controller may then lock P4 for this event when the lock is released for the prior event. In certain embodiments, the thread in executing the code associated with this event may just stop or the process may be killed since it may not proceed without locking the desired resource. In some embodiments, the thread may ignore this action and proceed to the next action in the code. Different embodiments may handle this differently.

In one example, the GUI may display a table visualization and a bar chart visualization where the user would like to add another column to the bar chart. To add a new column into the bar chart visualization, some embodiments may determine to lock the criteria component. In addition to the criteria component, to modify the bar chart visualization, embodiments may determine to lock the bar chart visualization as well as it would be modified to add the new column. After the changes to the bar chart visualization is complete, the XML representing the document structure can be updated. In another instance, if the user desires to add another column (e.g., revenue) into the table visualization prior to completing the prior event (i.e., adding the new column into the bar chart visualization), since the criteria component has already been locked, the transaction would be prohibited. However, once the prior event is completed and the locks have been released, then the application may proceed to process the new event of adding another column into the table visualization.

Figure 6:
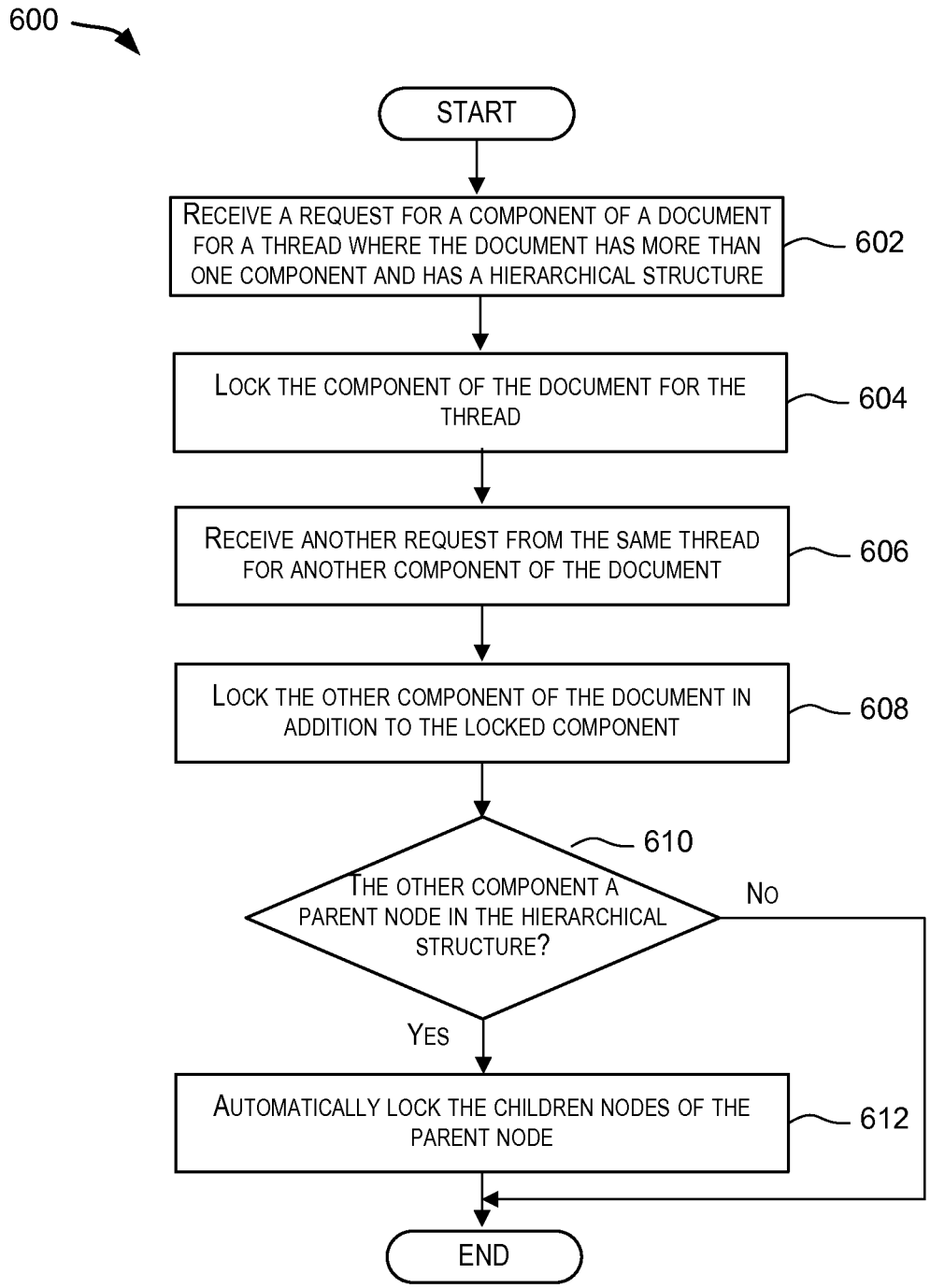
FIG. 6 illustrates an example process for extending the lock to multiple components of a document with a hierarchical document structure.

FIG. 6 illustrates an example process 600 for extending the lock to multiple components of a document with a hierarchical document structure. When a user performs an action in a GUI, a portion of the document may need to be modified and therefore a lock on this part of the document may be needed. During the processing of the same call, a visual analyzer application (e.g., an action handler) may determine that another part of the document may need to be accessed, and therefore the lock may need to be widened to include that part of the document. In some embodiments, the other part of the document may be a parent node in the hierarchical document structure, thereby leading to one or more children nodes being automatically locked along with the parent node. Rather than locking portions of a document on a single level, a lock manager may lock a parent level in a hierarchical document structure, which would in turn lock everything below it.

At block 602, process 600 receives a request for a resource (or also referred to as a portion or a component) of a document for a thread. There can be multiple resources in a document that can be accessed by various user actions/threads/processes.

At block 604, process 600 locks that resource. Even when the first portion of the document is locked, other portions of the document may still be accessible by other threads. At a first time, there is a portion of a document that is less than the whole that is being locked for a first process. The document may have several other portions or components of the document that are unlocked and available to be accessed by other user actions/threads/processes.

At block 606, process 600 receives another request from the same thread for another portion of the document. In some embodiments, the other portion of the document may be a non-leaf node in a tree representing the document, such as a parent node (while process 400 may only lock leaf nodes).

At block 608, process 600 locks that portion of the doc in addition to what was originally locked. The lock for the same thread may now cover the original portion and the second portion. In other words, the lock has been "extended" from just covering the original portion to also include the second portion of the document. The lock controller locks this portion for the thread and it also locks this portion in addition to locking the first portion. It can be said that the lock for the first thread is now being extended to not only cover the first portion but also the second portion.

At block 610, process 600 can determine whether the other portion of the document is a parent node in the hierarchical structure. Upon determining that the other portion of the document is not a parent node, process 600 ends. At block 612, upon determining that the other portion of the document is a parent node, process 600 can automatically lock the children nodes of the parent node. Based on the request, a lock controller determines to lock a non-leaf node within the tree. As the lock controller locks the non-leaf node, this results in the entire sub-tree being automatically locked (without user intervention).

Figure 7:
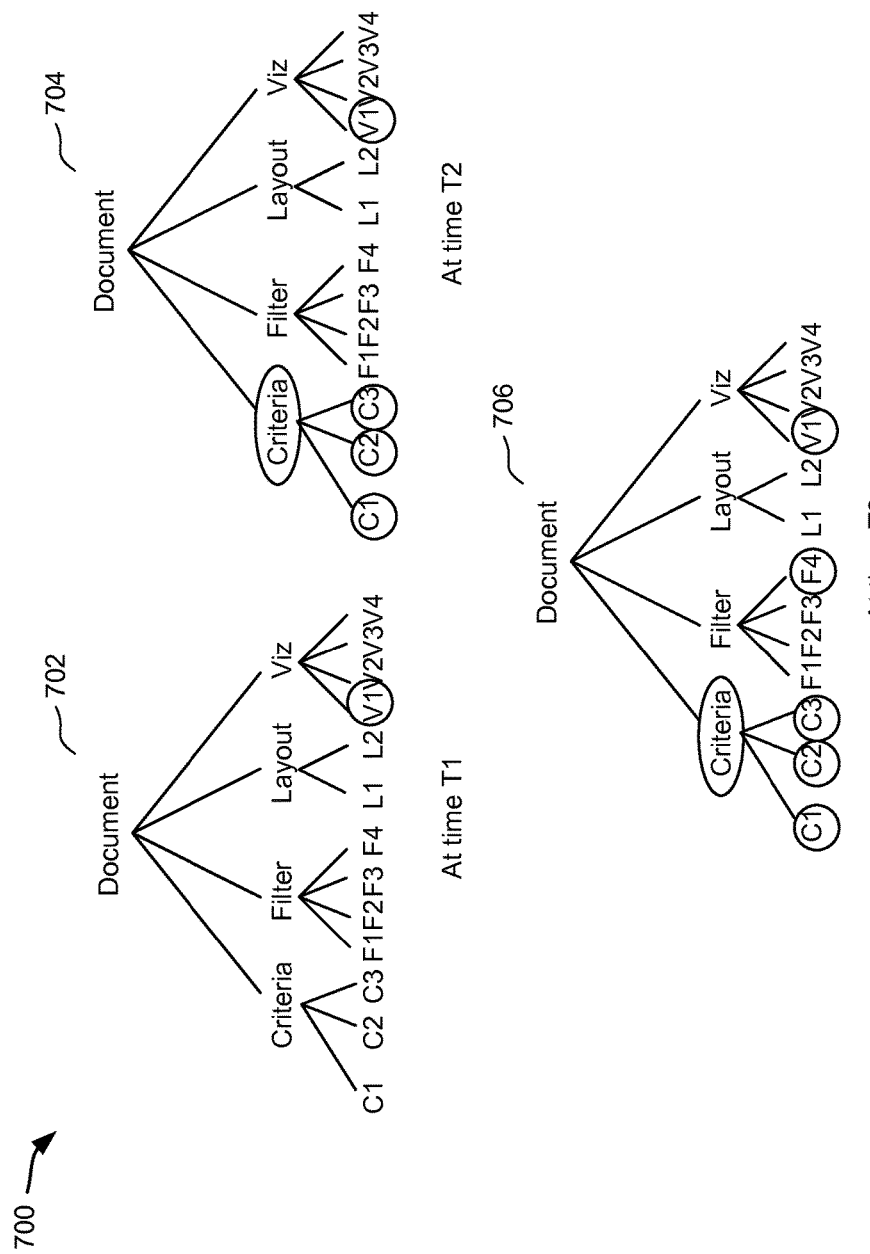
FIG. 7 illustrates an example sequence of locking multiple document components in a hierarchical document tree.

FIG. 7 illustrates an example sequence 700 of locking multiple document components in a hierarchical document tree. In this example, a document is represented in a hierarchical manner. The representative hierarchical structure of the document shown in this example is merely an example of how the hierarchical structure of the document may be represented. One of ordinary skill in the art would recognize may variations, alternatives, and modifications. The document can represent a GUI that can display multiple visualization components and other components that are part of a visual analyzer application.

As shown in this example, document can include multiple child nodes such as criteria, filter, layout, and viz. Each node can include further child node(s). As shown, criteria can include multiple children nodes, including C1-C3. Filter can include one or more children nodes, including F1-F4. Layout can include one or more children nodes, including L1 and L2. Views may include child nodes V1-V4. Similar to a non-hierarchical structure, a lock manager may lock different portions of the document. In the hierarchical structure, the lock manager may lock a parent node such that the level(s) below the parent node would be locked as well.

Upon receiving a user action directed to a portion of the document, the visual analyzer application may determine an event associated with the user action. The event may include multiple actions, such as A1 and A2, for a thread where a first portion and a second portion of the document may need to be locked. As shown in sequence 702, at time T1, a lock controller can lock a first portion of a document for a first thread (as indicated by the circling of V1). For example, the user interaction with a visualization may cause a visualization to be locked. There is a portion of a document, the visualization component, which is less than the whole, that is being locked for a first process. Different user interactions with different components may cause those other components to be locked instead. For example, if the user interaction is with a column, then the user interaction may cause the criteria category to be locked instead.

As shown in sequence 704, at time T2, where T2 is after T1, a lock controller can lock a second portion of the document for the same thread. As described, the code may include multiple actions or functions that would require the locking of the additional component. As the code executes, the visual analyzer application determines that the second portion of the document needs to be locked based on A2, and thereby extends the lock to lock the second portion, creating a wider lock. Sequence 704 shows that at time T2, the lock has been extended to include the locking of the criteria category (as indicated by the circle around the criteria category). In some embodiments, the lock has been extended because a lock controller has determined that an additional component (i.e., the criteria category) needs to be locked for execution of code associated with the event. The locking of the additional component may be for the same thread. In some embodiments, the locking of the additional component may be for a different thread.

As shown, in some embodiments, the extended lock may cover a parent node. As such, the code associated with the event need not expressly indicate that a lock on the children nodes of the parent node may be required for the code to execute. The child nodes may be effectively and automatically locked when the parent node is locked. In some embodiments, there is no need to lock the individual leaves if the hierarchy is locked. The parent is an accumulation of different portions of the document or a collection of portions. The sub-portions of a parent node can be locked when the parent is being locked. The ability to lock a parent that would in turn automatically lock all the child nodes (e.g., 2000 nodes) instead of having to lock every single child node (e.g., which may take 2000 seconds) is more efficient from a processing perspective and also allows for more flexibility in the system.

In this example, the user interaction with a visualization such as a bar chart may cause the locking of the visualization resource and the column resource. In some embodiments, if the user desires to make changes to another visualization (e.g., a table also being displayed on the GUI) before the previous event is complete, the application may not allow the user to do so since the column resource is already locked. However, if the user desires to interact with other parts of the document, then the user may be able to do so and cause other parts of the document to be locked.

Some embodiments may still permit user interaction with other components of the document while a portion of the document that is less than the entirety of the whole document is locked. If the user executes A2 and an action handler determines that the portion of the tree that A2 would need to access has already been locked, then the request to lock that portion of the tree will be denied. However, if the portion of the tree that A2 would need to access has not yet been locked, then the request may be granted. This allows multiple end user actions to access different parts of the tree at the same time.

As shown in sequence 706, at time T3, a lock has been placed on the filter category upon user interaction with a filter. The lock controller may determine that the filter component has not been locked and therefore the request to lock by the new event may be granted. As such, at time T3, lock controller locks the filter component for the thread that is separate from the first thread.

Another example of a locking of different levels in a hierarchical document structure can be when the user desires to add (or remove in some instances) another visualization to an already existing set of visualizations being displayed in the GUI of a visual analyzer application. Some embodiments may determine that the layout component and the viz components would need to be locked. Upon determining that these components are parent nodes, the visual analyzer application may proceed to automatically lock the subtree, or also referred to as the children nodes, of these components. As the event handler determines that the lock on the layout component may need to be extended to the viz component as the code flow progresses, the lock manager may also determine the need to expand the lock to the child components of these parent nodes in the document structure. After completing the event, the XML may be updated with the changes and the locks may be released.

As described, the code for an event (triggered by a user's action) may not know ahead of time which components it may need to change. As the code flow progresses, various event handlers may need to modify different parts of the report (also referred to as document throughout), which may then require the handler to acquire a lock for those parts before proceeding in some embodiments. This is the reason requiring lock expansion for handling the user's action. In some embodiments, only the code for the event (being processed by a thread) can indicate what parts of the report the server will modify and cause those parts of the report to be locked.

Figure 8:
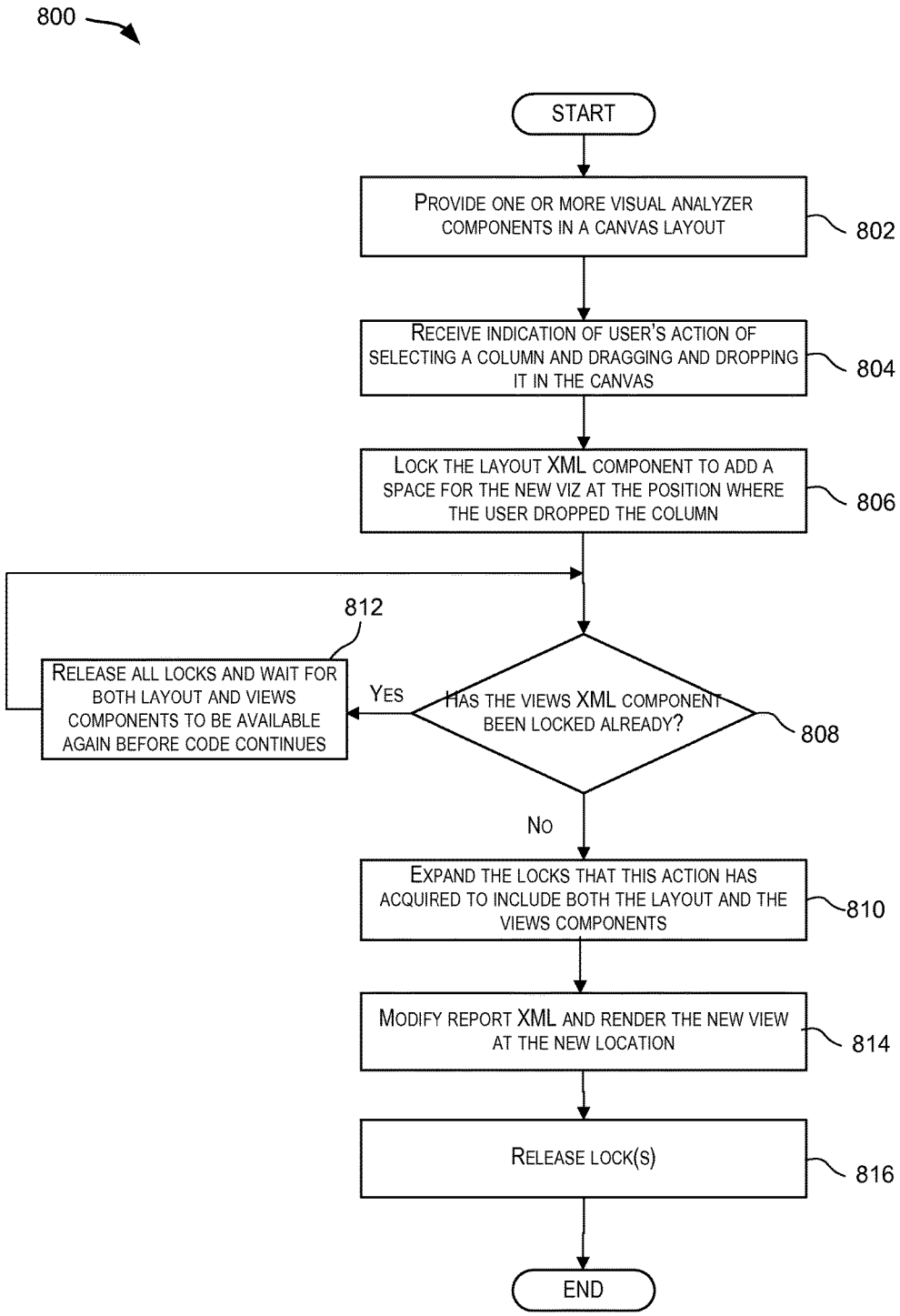
FIG. 8 illustrates an example process of creating a new visualization by dragging one or more data columns into a canvas layout of a visual analyzer application.

An example within the visual analyzer context can be provided to illustrate the expansion of a lock to cover additional XML components. FIG. 8 illustrates an example process 800 of creating a new visualization by dragging one or more data columns into a canvas layout of a visual analyzer application. Some embodiments may expand a lock (e.g., an umbrella lock) or the scope of a lock on a component to include additional components.

At block 802, process 800 can provide one or more visual analyzer components in a canvas layout. At block 804, process 800 can receive an indication of a user's action of selecting a column and dragging and dropping it into the canvas layout. In some embodiments, an action context is created when the drag starts. Nothing may be locked yet at this point since the code does not know where the user may drop the column(s).

At block 806, process 800 can lock the layout XML component. As the user drops the column(s) into the canvas, a canvas drop handler may lock the layout XML component so that it can add a space for the new visualization at the position where the user dropped the column(s). In some embodiments, the canvas drop handler may then pass control to a new viz creation handler. In some embodiments, the new viz creation handler may then lock the views XML component so that it can add the new visualization's definitions. This locking action will expand the locks that this action has acquired so far to include both the layout and views components.

At block 808, process 800 can make a determination as to whether the views XML component has already been locked. At block 810, upon determining that nothing has already locked views component, process 800 will acquire the views lock without being blocked. At block 812, upon determining that someone else has views component blocked, process 800 can release all locks and wait. In some embodiments, a lock manager may release the locks and wait for both layout and views components to be available again before the code is allowed to continue.

At block 814, process 800 can modify report XML and render the new view at the new location. In some embodiments, once the report XML has been modified to specify where it should be positions (layout component), and what it should look like (views component), then rendering handlers may be notified of the changes and they will render the new view at the new location. At block 816, process 800 then releases all locks. At this point, the action has completed and all locks it has held are released.

While handling an action that affects multiple components, the visual analyzer system may determine other components or shared resources that need to be locked (for instance to avoid overlapping usage in the shared resources). Often, there may be shared resources that are needed when performing certain actions. Some embodiments may need to be able to, in a consistent manner, persist update the underlying state after the fairly long roundtrip to the server. One scenario is when a user makes some changes to a visualization such as add a new column, new data for the column will need to be retrieved from the server. In some instances, the visual analyzer application may be unsure as to whether the operation will succeed until the data has been retrieved from the server because it is possible that the column that the user requested may not have a relation in the database side, so the application may get a database error when executing the query. In that case, some embodiments may desire to be able to roll back all the changes done, so that the report is not left in a broken state.

As such, some embodiments may desire to perform all the actions and not commit them to the state of the report until the application determines that it is a functional change. If something fails along the way, the application may roll back all the changes and reapply the original state. This may not work if there are multiple components changing a component or if a component is involved in two different transactions. As such, the techniques for expansion of locks described in this disclosure may help maintain consistency for a project XML of a visual analyzer application and minimize the risk of compromising the integrity of components that are part of the project XML that may potentially be affected by multiple asynchronous calls.

Figure 9:
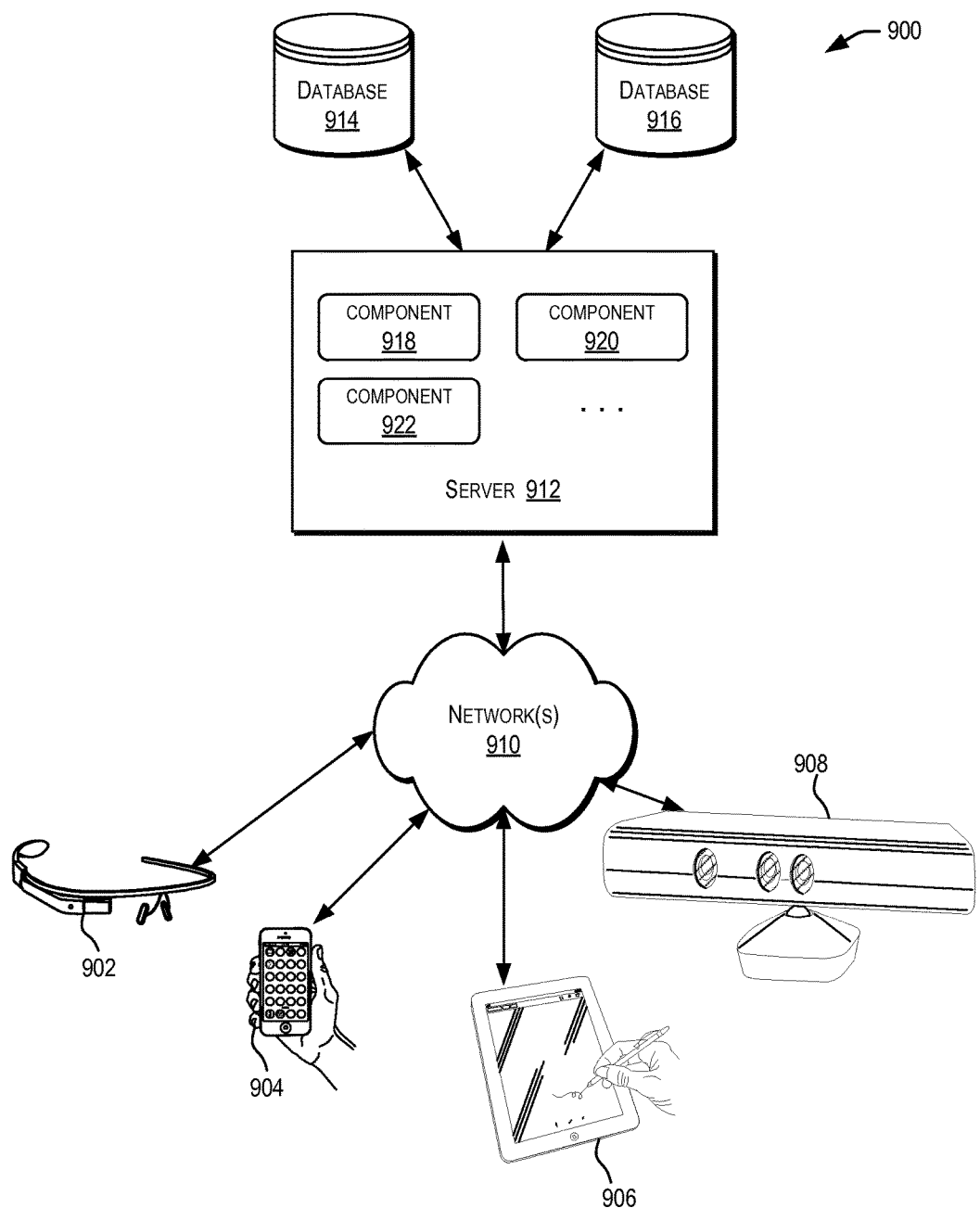
FIG. 9 depicts a simplified diagram of a distributed system for implementing an embodiment.

FIG. 9 depicts a simplified diagram of a distributed system 900 for implementing an embodiment. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications such as services and applications that provide the document (e.g., webpage) analysis and modification-related processing. In certain embodiments, server 912 may also provide other services or software applications that can include non-virtual and virtual environments. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in FIG. 9, software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in FIG. 9 is thus one example of a distributed system for implementing an embodiment system and is not intended to be limiting.

Client computing devices 902, 904, 906, and/or 908 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox® gaming console with or without a Kinect® gesture input device), and/or a personal messaging device, capable of communicating over network(s) 910.

Although distributed system 900 in FIG. 9 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network (s) 910 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 912 can include one or more virtual machines running virtual operating systems, or other computing architectures involving virtualization. One or more flexible pools of logical storage devices can be virtualized to maintain virtual storage devices for the server. Virtual networks can be controlled by server 912 using software defined networking. In various embodiments, server 912 may be adapted to run one or more services or software applications described in the foregoing disclosure. For example, server 912 may correspond to a server for performing processing as described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. These databases may provide a mechanism for storing information such as user interactions information, usage patterns information, adaptation rules information, and other information used by embodiments of the present invention. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
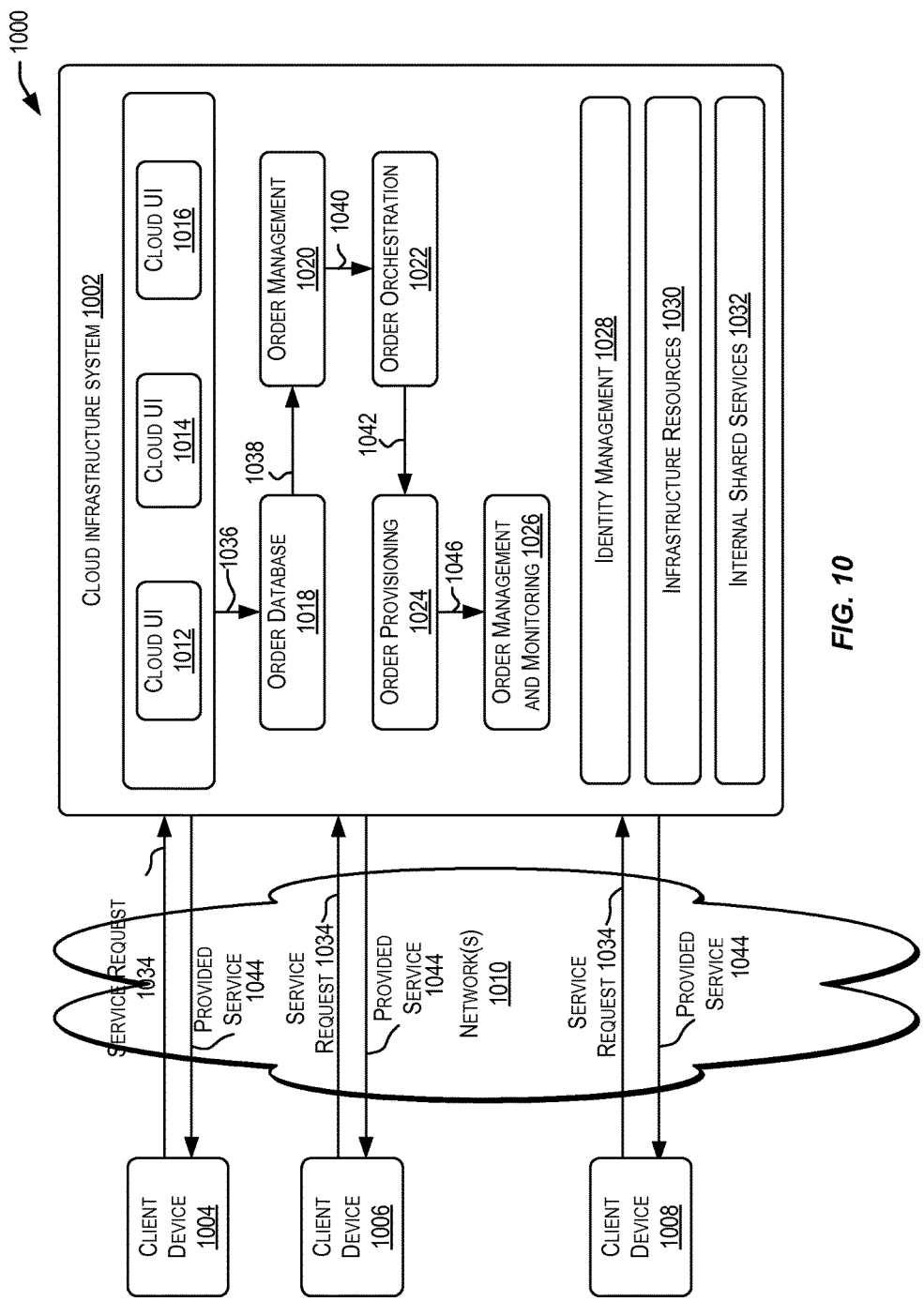
FIG. 10 is a simplified block diagram of one or more components of a system environment in which services may be offered as cloud services, in accordance with an embodiment of the present disclosure.

In some embodiments, the document analysis and modification services described above may be offered as services via a cloud environment. FIG. 10 is a simplified block diagram of one or more components of a system environment 1000 in which services may be offered as cloud services, in accordance with an embodiment of the present disclosure. In the illustrated embodiment in FIG. 10, system environment 1000 includes one or more client computing devices 1004, 1006, and 1008 that may be used by users to interact with a cloud infrastructure system 1002 that provides cloud services, including services for dynamically modifying documents (e.g., webpages) responsive to usage patterns. Cloud infrastructure system 1002 may comprise one or more computers and/or servers that may include those described above for server 412.

It should be appreciated that cloud infrastructure system 1002 depicted in FIG. 10 may have other components than those depicted. Further, the embodiment shown in FIG. 10 is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908. Client computing devices 1004, 1006, and 1008 may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002. Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

In certain embodiments, services provided by cloud infrastructure system 1002 may include a host of services that are made available to users of the cloud infrastructure system on demand. In addition to services related to dynamic document modification responsive usage patterns, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1002 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's website.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1002 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle Corporation) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1002 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1002 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform, and other resources.

In some embodiments, resources in cloud infrastructure system 1002 may be shared by multiple users and dynamically re-allocated per demand. Additionally, resources may be allocated to users in different time zones. For example, cloud infrastructure system 1002 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 to enable provision of services by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in FIG. 10, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In an exemplary operation, at 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI) such as cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

At 1036, the order information received from the customer may be stored in an order database 1018. If this is a new order, a new record may be created for the order. In one embodiment, order database 1018 can be one of several databases operated by cloud infrastructure system 1018 and operated in conjunction with other system elements.

At 1038, the order information may be forwarded to an order management module 1020 that may be configured to perform billing and accounting functions related to the order, such as verifying the order, and upon verification, booking the order.

At 1040, information regarding the order may be communicated to an order orchestration module 1022 that is configured to orchestrate the provisioning of services and resources for the order placed by the customer. In some instances, order orchestration module 1022 may use the services of order provisioning module 1024 for the provisioning. In certain embodiments, order orchestration module 1022 enables the management of business processes associated with each order and applies business logic to determine whether an order should proceed to provisioning.

As shown in the embodiment depicted in FIG. 10, at 1042, upon receiving an order for a new subscription, order orchestration module 1022 sends a request to order provisioning module 1024 to allocate resources and configure resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. This enables order orchestration module 1022 to be isolated from implementation details, such as whether or not services and resources are actually provisioned on the fly or pre-provisioned and only allocated/assigned upon request.

At 1044, once the services and resources are provisioned, a notification may be sent to the subscribing customers indicating that the requested service is now ready for use. In some instance, information (e.g. a link) may be sent to the customer that enables the customer to start using the requested services.

At 1046, a customer's subscription order may be managed and tracked by an order management and monitoring module 1026. In some instances, order management and monitoring module 1026 may be configured to collect usage statistics regarding a customer use of subscribed services. For example, statistics may be collected for the amount of storage used, the amount of data transferred, the number of users, and the amount of system up time and system down time, and the like.

In certain embodiments, cloud infrastructure system 1000 may include an identity management module 1028 that is configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
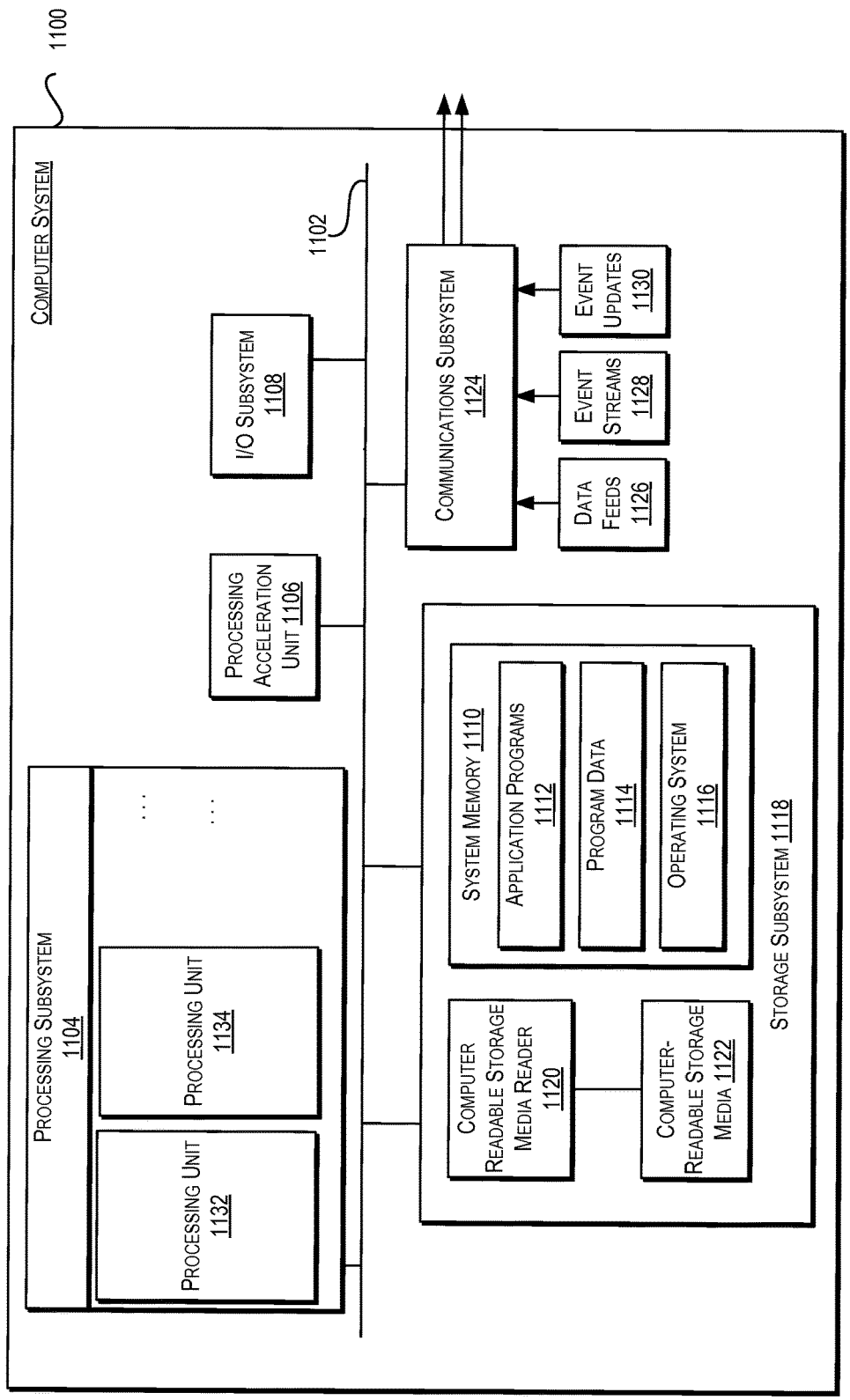
FIG. 11 illustrates an exemplary computer system that may be used to implement an embodiment of the present invention.

FIG. 11 illustrates an exemplary computer system 1100 that may be used to implement an embodiment of the present invention. In some embodiments, computer system 1100 may be used to implement any of the various servers and computer systems described above. As shown in FIG. 11, computer system 1100 includes various subsystems including a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 may include tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processing units 1132, 1134, etc. A processing unit may include be one or more processors, including single core or multicore processors, one or more cores of processors, or combinations thereof. In some embodiments, processing subsystem 1104 can include one or more special purpose co-processors such as graphics processors, digital signal processors (DSPs), or the like. In some embodiments, some or all of the processing units of processing subsystem 1104 can be implemented using customized circuits, such as application specific integrated circuits (ASICs), or field programmable gate arrays (FPGAs).

In some embodiments, the processing units in processing subsystem 1104 can execute instructions stored in system memory 1110 or on computer readable storage media 1122. In various embodiments, the processing units can execute a variety of programs or code instructions and can maintain multiple concurrently executing programs or processes. At any given time, some or all of the program code to be executed can be resident in system memory 1110 and/or on computer-readable storage media 1122 including potentially on one or more storage devices. Through suitable programming, processing subsystem 1104 can provide various functionalities described above for dynamically modifying documents (e.g., webpages) responsive to usage patterns.

In certain embodiments, a processing acceleration unit 1106 may be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term "input device" is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1118 provides a repository or data store for storing information that is used by computer system 1100. Storage subsystem 1118 provides a tangible non-transitory computer-readable storage medium for storing the basic programming and data constructs that provide the functionality of some embodiments. Software (programs, code modules, instructions) that when executed by processing subsystem 1104 provide the functionality described above may be stored in storage subsystem 1118. The software may be executed by one or more processing units of processing subsystem 1104. Storage subsystem 1118 may also provide a repository for storing data used in accordance with the present invention.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM) or dynamic random access memory (DRAM).

By way of example, and not limitation, as depicted in FIG. 11, system memory 1110 may store application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1122 may store programming and data constructs that provide the functionality of some embodiments. Software (programs, code modules, instructions) that, when executed by processing subsystem 1104 provides the functionality described above, may be stored in storage subsystem 1118. By way of example, computer-readable storage media 1122 may include non-volatile memory such as a hard disk drive, a magnetic disk drive, an optical disk drive such as a CD ROM, DVD, a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1122 may provide storage of computer-readable instructions, data structures, program modules, and other data for computer system 1100.

In certain embodiments, storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for storing computer-readable information.

In certain embodiments, computer system 1100 may provide support for executing one or more virtual machines. Computer system 1100 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1100. Accordingly, multiple operating systems may potentially be run concurrently by computer system 1100. Each virtual machine generally runs independently of the other virtual machines.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices. For example, visual analyzer system 102 depicted in FIG. 1 may receive user interactions information and webpage requests from client devices using communication subsystem 1124. Additionally, communication subsystem 1124 may be used to communicate webpages from visual analyzer system 102 to the requesting clients.

Communication subsystem 1124 may support both wired and/or wireless communication protocols. For example, in certain embodiments, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

Communication subsystem 1124 can receive and transmit data in various forms. For example, in some embodiments, communications subsystem 1124 may receive input communication in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1100 depicted in FIG. 11 is intended only as a specific example. Many other configurations having more or fewer components than the system depicted in FIG. 11 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
   receiving a request for a first component of a document for a first thread, the document displayed by a graphical user interface (GUI) and having multiple components including the first component and a second component;
   locking, by one or more processors, the first component of the document using an initial lock upon receiving an interaction of a user with the first component;
   determining, by the one or more processors, an event associated with the interaction of the user with the first component;
   determining, by the one or more processors and based on code associated with the event, a set of actions to be executed for the event;
   determining, by the one or more processors, a second component that is implemented to execute one or more actions from the set of actions for the event; and
   extending, by the one or more processors, the initial lock to the second component of the document for the same thread in order to lock the second component.

2. The method of claim 1, further comprising: upon receiving another request for a third component in the document for a second thread, locking the third component of the document, wherein the third component is not currently locked by a prior event.

3. The method of claim 1, further comprising: upon receiving another request for the first component in the document for a second thread, queueing the other request until the initial lock on the first component has been released.

4. The method of claim 1, wherein the second component is a parent node in the document with a hierarchical structure, the parent node having one or more child nodes, wherein the method further comprises: automatically locking the one or more child nodes under the parent node in response to locking the second component of the document.

5. The method of claim 1, wherein the request for the first component is received upon receiving a user request to resize a visualization component in the GUI, and wherein the first component is the visualization component and the second component is a grid component.

6. The method of claim 1, wherein the request for the first component of the document is received in response to the interaction of the user directed at the first component in the GUI of a visual analyzer application, the method further comprises:
   receiving a request for a third component of the document in response to a separate user interaction directed at a third component in the GUI;
   determining whether to lock the third component based on an event associated with the user interaction, the event specifying to lock one or more additional components, wherein
   determining whether to lock the third component includes determining whether the third component and the one or more additional components are currently locked by a prior event; and
   locking the third component and the one or more additional components when it is determined that the third component and the one or more additional components are not currently locked by a prior event.

7. A system comprising:
   one or more processors; and memory coupled to the one or more processors, the memory encoded with a set of instructions configured to perform a process comprising:

receiving a request for a first component of a document for a first thread, the document displayed by a graphical user interface (GUI) and having multiple components including the first component and a second component;

locking, by the one or more processors, the first component of the document using an initial lock upon receiving an interaction of a user directed at the first component;

determining, by the one or more processors, an event associated with the interaction of the user with the first component;

determining, by the one or more processors and based on code associated with the event, a set of actions to be executed for the event;

determining, by the one or more processors, a second component that is implemented to execute one or more actions from the set of actions for the event; and extending, by the one or more processors, the initial lock to the second component of the document for the same thread in order to lock the second component.

8. The system of claim 7, wherein the set of instructions are further configured to perform the process comprising: upon receiving another request for a third component in the document for a second thread, locking the third component of the document, wherein the third component is not currently locked by a prior event.

9. The system of claim 7, wherein the set of instructions are further configured to perform the process comprising: upon receiving another request for the first component in the document for a second thread, queueing the other request until the initial lock on the first component has been released.

10. The system of claim 7, wherein the second component is a parent node in the document with a hierarchical structure, the parent node having one or more child nodes, wherein the set of instructions are further configured to perform the process comprising: automatically locking the one or more child nodes under the parent node in response to locking the second component of the document.

11. The system of claim 7, wherein the request for the first component is received upon receiving a user request to resize a visualization component in the GUI, and wherein the first component is the visualization component and the second component is a grid component.

12. The system of claim 7, wherein the request for the first component of the document is received in response to the interaction of the user directed at the first component in the GUI of a visual analyzer application, the method further comprises:

receiving a request for a third component of the document in response to a separate user interaction directed at the third component in the GUI;

determining whether to lock the third component based on an event associated with the user interaction, the event specifying to lock one or more additional components, wherein determining whether to lock the third component includes determining whether the third component and the one or more additional components are currently locked by a prior event; and locking the third component and the one or more additional components when it is determined that the third component and the one or more additional components are not currently locked by a prior event.

13. A non-transitory computer readable storage medium storing instructions that, when executed by one or more processors of a first computing device, cause the first computing device to perform operations comprising:

receiving a request for a first component of a document for a first thread, the document displayed by a graphical user interface (GUI) and having multiple components including the first component and a second component;

locking, by one or more processors, the first component of the document using an initial lock upon receiving an interaction of a user directed at the first component;

determining, by the one or more processors, an event associated with the interaction of the user with the first component;

determining, by the one or more processors and based on code associated with the event, a set of actions to be executed for the event;

determining, by the one or more processors, a second component that is implemented to execute one or more actions from the set of actions for the event; and extending, by the one or more processors, the initial lock to the second component of the document for the same thread in order to lock the second component.

14. The computer readable storage medium of claim 13, wherein the instructions further cause the first computing device to perform operations comprising: upon receiving another request for a third component in the document for a second thread, locking the third component of the document, wherein the third component is not currently locked by a prior event.

15. The computer readable storage medium of claim 13, wherein the instructions further cause the first computing device to perform operations comprising: upon receiving another request for the first component in the document for a second thread, queueing the other request until the initial lock on the first component has been released.

16. The computer readable storage medium of claim 13, wherein the second component is a parent node in the document with a hierarchical structure, the parent node having one or more child nodes, wherein the instructions further cause the first computing device to perform operations comprising: automatically locking the one or more child nodes under the parent node in response to locking the second component of the document.

17. The computer readable storage medium of claim 13, wherein the request for the first component is received upon receiving a user request to resize a visualization component in the GUI, and wherein the first component is the visualization component and the second component is a grid component.

* * * * *